(12) United States Patent
Berger et al.

(10) Patent No.: US 7,347,221 B2
(45) Date of Patent: Mar. 25, 2008

(54) SOLENOID VALVE

(75) Inventors: Siegfried Berger, Schilerbach (DE); Joachim Forster, Winnenden (DE)

(73) Assignee: Karl Dungs GmbH & Co. Kg, Urbach (DE)

( * ) Notice: Subject to any disclaimer, the term of this patent is extended or adjusted under 35 U.S.C. 154(b) by 332 days.

(21) Appl. No.: 11/045,835

(22) Filed: Jan. 27, 2005

(65) Prior Publication Data

US 2005/0166979 A1 Aug. 4, 2005

(30) Foreign Application Priority Data

Jan. 30, 2004 (DE) .................... 10 2004 004 708

(51) Int. Cl.
*F16K 3/24* (2006.01)
*H01F 7/08* (2006.01)

(52) U.S. Cl. ............ 137/628; 137/614.18; 137/630.22; 335/265

(58) Field of Classification Search .......... 137/630.19, 137/630.22, 628, 614.11, 614.18; 335/265
See application file for complete search history.

(56) References Cited

U.S. PATENT DOCUMENTS

| 2,964,286 | A | * | 12/1960 | Hoskins ................... 251/30.04 |
| 3,110,826 | A | * | 11/1963 | Gerstenfeld et al. .......... 310/23 |
| 3,314,448 | A | * | 4/1967 | Wolff et al. .............. 137/627.5 |
| 3,538,954 | A | * | 11/1970 | Bowsher et al. ........ 137/625.65 |
| 3,815,633 | A | * | 6/1974 | Greenwood et al. ... 137/625.27 |
| RE29,863 | E | * | 12/1978 | Kozel et al. ................. 137/242 |
| 4,368,753 | A | * | 1/1983 | Brakelmann et al. ....... 137/240 |
| 4,538,129 | A | * | 8/1985 | Fisher ......................... 335/230 |
| 4,559,971 | A | * | 12/1985 | Bradshaw .............. 137/596.17 |
| 5,814,907 | A | * | 9/1998 | Bandera ...................... 310/14 |
| 6,148,862 | A | * | 11/2000 | Doll ........................... 137/884 |

FOREIGN PATENT DOCUMENTS

| DE | 199 33 329 C1 | | 7/1999 |
| DE | 103 06 003 A1 | | 8/2003 |
| DE | 10306001 A1 | * | 11/2003 |
| EP | 0 757 200 A2 | | 2/1997 |
| EP | 0 978 688 A | | 2/2000 |
| EP | 1 084 358 A | | 3/2001 |

* cited by examiner

*Primary Examiner*—John Rivell
*Assistant Examiner*—Craig Price
(74) *Attorney, Agent, or Firm*—Reed Smith LLP

(57) ABSTRACT

A valve assembly comprises two valves and a single solenoid actuator with only one magnetizing coil that controls both valves. The corresponding magnetic circuit comprises a yoke with only two pole pieces. The valves are arranged concentric to one another. The valve closing element of the outer valve is connected to an armature by means of a sleeve. The cup thus formed receives the armature that is connected to the valve closing element of the inner valve. The pole piece and the armature form a transmission air gap through which the sleeve extends. A coupling air gap is formed between the armatures. The armature and the pole piece form a working air gap. The valves are opened collectively and are able to close independently of one another when the coil is rendered currentless.

5 Claims, 7 Drawing Sheets

SOLENOID VALVE

CROSS REFERENCE TO RELATED APPLICATIONS

This application claims priority to German Application No. 10 2004 004 708.1 filed Jan. 30, 2004, which is incorporated herein by reference.

TECHNICAL FIELD OF THE INVENTION

The invention pertains to a valve assembly, in particular, for safety-relevant gas applications.

BACKGROUND OF THE INVENTION

In gas-operated devices, it is frequently required to utilize valves that are electrically opened and reliably close in the currentless state. In order to achieve the desired protection against malfunctions of valve components, two valves are usually arranged one behind another in the gas flow, with the two valves opening and closing independently of one another. If one of the valves becomes stuck in the open position, the second valve is still able to close and shut off the valve assembly, i.e., it is ensured that the valve assembly is closed.

There also exists double-seat valve assemblies, in which both valves and the corresponding solenoid actuators are structurally combined with one another. For example, EP 0 757 200 B1 discloses a double-seat valve of this type with two coaxial valve seats that are axially spaced apart from one another, with a separate valve closing element being assigned to each valve seat. The two independent valve closing elements are opened by means of a solenoid actuator with a single magnetizing coil and an external magnetic circuit. Associated with this circuit are two armatures, one armature being realized in a hollow-cylindrical manner (with a closed upper end), and the other armature being realized in the form of a cylinder. The two armatures are arranged coaxial to one another such that the cylindrical armature is situated in the hollow-cylindrical armature.

During a magnetic excitation of the magnetic circuit, a part of the flux line extends through the outer armature and the other part of the flux line extends through the inner armature such that both armatures are attracted and both valve closing elements are moved into the open position. However, dimensions are somewhat critical to this arrangement since it must be assured that the inner armature receives sufficient magnetic flux. This requires a relatively intense magnetic excitation of the magnetic circuit, and correspondingly dimensioned coils and control circuits.

EP 1 084 357 B1 discloses a double-seat valve assembly in which the integration or combination of both valves is even more advanced. A common valve seat is associated with both valve closing elements. The valve closing elements are arranged concentric to one another. In this case, only the inner valve closing element is connected to an armature and the outer valve closing element is connected to a non-magnetic sleeve that surrounds the armature.

Although this arrangement makes it possible to easily control two valve closing elements with a single coil, it causes a relatively high leakage flux because the non-magnetic sleeve completely surrounds the inner armature.

The electrical control of solenoid valves is a significant cost factor. In this respect, one attempt to realize the assembly with the smallest coils possible, i.e., with the lowest quantities of copper and with low control currents, particularly with low holding currents. On the other hand, it must be ensured that the valve closes when the current is switched off or an outage occurs.

Based on these circumstances, the invention aims to develop a simply designed and reliable solenoid valve assembly that can be controlled with low currents.

SUMMARY OF THE INVENTION

This objective is attained with the valve assembly according to Claim 1: The valve assembly according to the invention comprises two valve closing elements that can be moved into the open position by exciting a single magnetizing coil. One armature is respectively assigned to each valve closing element, with the two armatures preferably being arranged axially one behind another. An outer magnetic circuit with two pole pieces belongs to the magnetizing coil. The upper pole piece is assigned to the upper armature and the lower pole piece is assigned to the lower armature. A working air gap is formed between the two armatures. In addition, the upper armature forms a working air gap together with the upper pole piece. This measure ensures that upon excitation of the magnetizing coil, the ensuing magnetic flux flows through the two armatures in succession. This causes the two armatures not only to be pulled toward one another, but also to move upward, i.e., in the opening direction relative to the valve closing elements. The two valve closing elements are able to close independently of one another if the excitation ceases. Should the upper armature become stuck in the open position, the lower (inner) armature can still be moved into the closed position. If the lower (inner) armature becomes stuck, the upper armature and its closing element can be easily moved into the closed position.

Since the special design of the magnetic circuit ensures a serial flux through both armatures, the magnetic flux generated by the coil is well utilized. Only relatively low currents are required for controlling and for holding the valves in the open position. The magnetic circuit only causes a low leakage flux. The working air gap defined between the first (upper) armature and the first (upper) pole piece can assume a minimal gap width with low leakage flux in the excited position. This applies analogously to the coupling air gap formed between the armatures. Consequently, it is possible to operate the valve with an electric and magnetic excitation that is no more intense than that for a single valve.

The first (upper) armature is preferably connected to the associated valve closing element by means of a pipe section. The pipe section may consist of a thin-walled stainless steel pipe, a thin-walled brass pipe, a thin-walled plastic pipe or the like, and is preferably non-magnetic. However, it would also be possible to utilize a ferromagnetic material. In this case, the wall thickness is made small enough that the magnetic reluctance in the axial direction is large enough that no significant magnetic short circuit results for the working or coupling air gap formed between the two armatures.

If the connecting sleeve or pipe section between the outer valve closing element and the first armature consists of a non-magnetic material that differs from the material of the first armature, it is necessary to mechanically produce a suitable gas-tight connection between the pipe section or sleeve and the first armature. The connection may be produced, for example, by means of laser welding, electron beam welding, bonding, screws, flanging or the like. A flanged connection that is utilized in connection with a corresponding elastomeric gasket, e.g., an O-ring, can be easily and inexpensively produced.

If the connecting sleeve consists of armature material, i.e., magnetic material, it is advantageous for the armature and sleeve to be integrally connected to one another such that no leakage problems occur.

The sleeve extends through the transmission air gap formed between the second pole piece and the second armature, with this transmission air gap preferably being longer in the axial direction than the axial travel of the second armature. This prevents forces that axially move the armature from being generated in the transmission air gap. However, the transmission air gap may also be utilized for boosting the armature actuation. This is achieved with a design, in which the second armature protrudes from the corresponding pole piece when the associated valve closing element is seated on its valve seat. This design causes the transmission air gap to increase when the corresponding valve is opened.

The second armature may be guided and supported in the sleeve or pipe section by means of corresponding centering means, for example, sliding rings. The sleeve or pipe section may be correspondingly supported in the second pole piece by means of centering means, for example, sliding rings. If so required, the first armature may be supported in a centered fashion in the first pole piece. Sliding rings may also ensure the guidance and mobility of the armature in this case.

Other details of advantageous developments of the invention are disclosed in the figures, the description, or the claims.

BRIEF DESCRIPTION OF THE DRAWINGS

Embodiments of the invention are illustrated in the figures. For a fuller understanding of the invention, reference is had to the following description taken in connection with the accompanying drawing(s), in which.

DETAILED DESCRIPTION OF THE INVENTION

Figure 1:
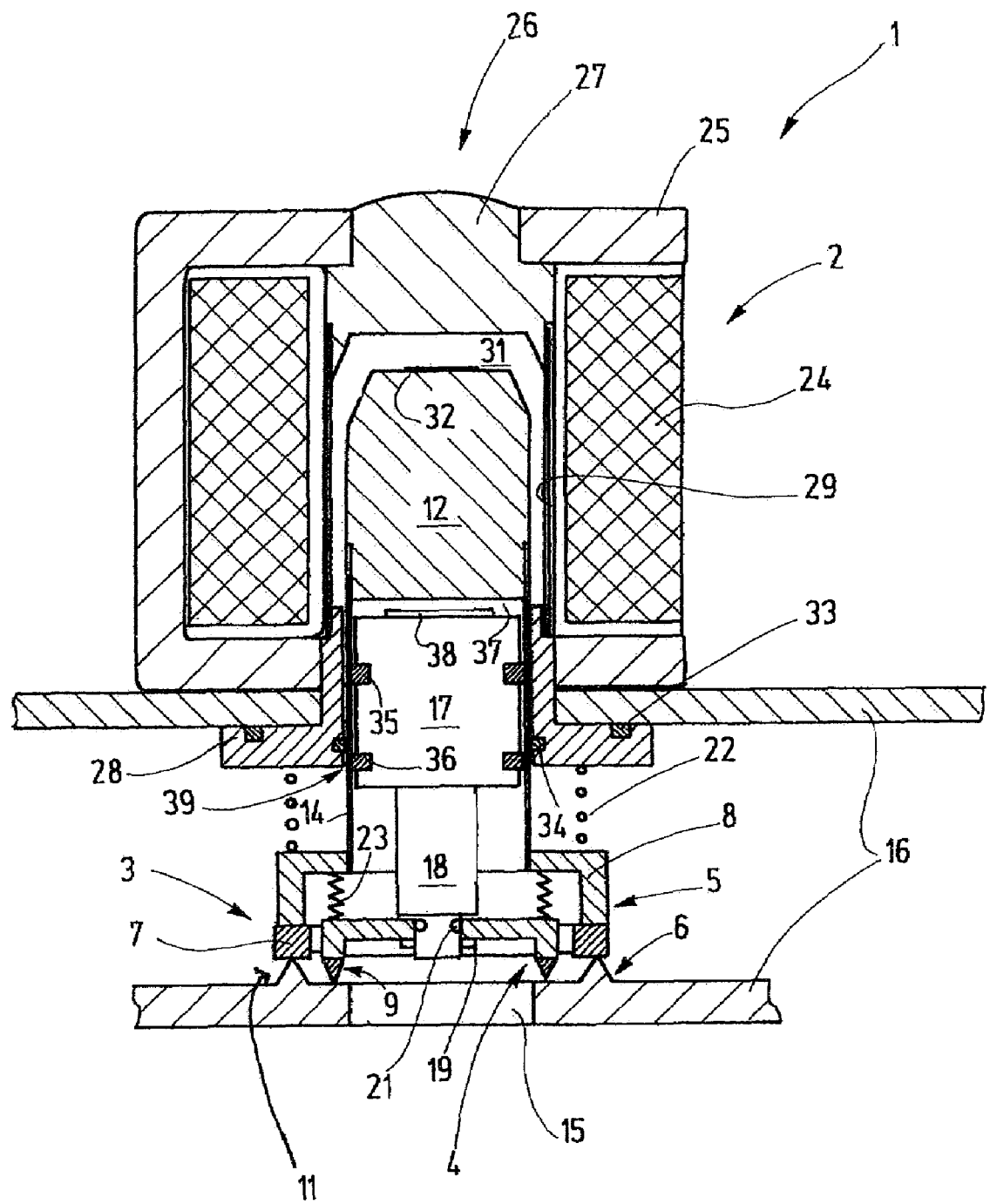
FIG. 1 is a schematic longitudinal section through a first embodiment of the valve assembly according to the invention, in the closed position.

FIG. 1 shows a valve assembly 1 that comprises a solenoid actuator 2 and two valves 3, 4. The valve 3 is formed by a valve closing element 5 and a valve seat 6. The valve closing element 5 contains an annular sealing member 7, made of an elastomer, for example that is held on an annular face of a hollow-cylindrical body 8 that is closed on the top and has approximately the shape of a cup or bell.

The valve 4 comprises a valve closing element 9 and a valve seat 11. The valve seats 6, 11 may be structurally combined with one another, as shown in FIG. 1. This can be achieved, for example, by realizing the valve seat 6 in the form of an annular rib that concentrically surrounds the valve seat 11 realized in the form of a planar annular surface. However, it would also be possible to arrange the two valve seats 6, 11 separately from one another in the same plane or in different planes, but in both instances they are preferably arranged coaxial to one another.

A first armature 12 in the form of an approximately cylindrical ferromagnetic body, for example, an iron body, is assigned to the valve closing element 3. The armature 12 is connected to the body 8 by means of a sleeve 14, with the connection between the sleeve 14 and the armature 12 preferably being realized in a rigid and gas-tight fashion. Flanged connections, bonded connections, or laser-welded connections are preferred if the sleeve 14 consists, for example, of stainless steel or another material that cannot be substantially magnetized. The connection between the sleeve 14 and the body 8 is axially rigid, but preferably allows a certain pivoting movement in order to compensate for any play. Corresponding connecting means with holding rings and a sealing element are known, for example, from EP 0 757 200 B1. The armature 12, the sleeve 14, the body 8 and the sealing member 7 are gas-tight. If the sealing member 7 is seated on the valve seat 6, no gas can flow through the opening 15 formed by the valve seats 6 and 11, respectively, that is arranged in a valve housing 16 (not shown) or its intermediate wall, and regardless of whether the valve closing element 9 is situated in the open or in the closed position.

The second armature 17 that has, for example, an essentially cylindrical shape is assigned to the valve closing element 9 and is arranged in an axially movable fashion within the sleeve 14. The armature 17 is connected to the valve closing element 9 by means of a valve spindle 18, with the connection being axially rigid, but preferably allowing a certain pivoting movement. This connection is schematically indicated in FIG. 1 in the form of a holding ring 19 and a ring seal 21.

Both valve closing elements 5, 9 are biased in the closing direction. This is achieved with corresponding closing springs 22, 23 that may be realized, for example, in the form of coil springs, and are arranged concentric to the valve closing elements 5, 9. The closing spring 22 can be supported on the valve housing 16, while the closing spring 23 is supported, for example, between the valve closing elements 5, 9.

The solenoid actuator 2 comprises a magnetizing coil 24, a yoke 25, and a keeper sleeve 26, which in turn comprises a first or upper pole piece 27, a second or lower pole piece 28, and a sleeve 29 for connecting the two pole pieces 27, 28 to one another in a gas-tight fashion. The sleeve 29 preferably consists of a non-magnetic material or of stainless steel, and is welded, bonded or otherwise connected in a gas-tight fashion to flange-like ends of the respective pole pieces 27, 28.

The upper pole piece 27 is arranged in the yoke 25 that encompasses the outside of the coil 24 and forms an approximately disk-shaped working air gap 31 together with the upper face of the armature 12. The corresponding boundaries of the working air gap 31 are formed by the face of the yoke 25 that points toward the armature 12, and preferably is realized as a plane surface, and the upper face of the armature 12 is preferably also a plane surface. A thin anti-adhesive disk 32, for example, in the form of a plastic disk or a brass disk, may be arranged on the face of the armature 12. In other respects, the armature 12 may have the shape of a cone or a truncated cone at its upper end, with the inside contour of the pole piece 27 being correspondingly adapted in this case. This can serve to increase the force of attraction of the armature 12.

The lower pole piece 28 preferably is realized in the form of a magnetic sleeve that is seated in a corresponding recess of the yoke 25, i.e., a lower limb thereof that extends underneath the coil 24. In addition, the pole piece 28 may be provided with a radial flange that adjoins the valve housing 26 from the inside and is sealed relative to it by means of a sealing element, for example, an O-ring 33. The radial flange of the pole piece 28 may be pressed against the inner side of the valve housing 16 when the keeper sleeve 26 is subjected to a corresponding outwardly (upwardly) directed tension. This tension exerted upon the pole piece 27 can be transmitted to the keeper sleeve 26 via the yoke 25.

The axially movable support of the sleeve 14 and the armature 12 connected to it is achieved by providing a sliding ring 34 on the inside of the pole piece 28, said sliding ring is seated in a groove of the pole piece 28 that is open inward radially. The sliding ring ensures that the sleeve 29 does not contact the inner wall of the pole piece 28.

The armature 17 that is supported in the sleeve 14 in an axially movable fashion may accordingly be provided with one or more sliding rings 35, 36 on its outer periphery, with said sliding rings being seated in corresponding annular peripheral grooves. The sliding rings 34, 35, 36 are realized, for example, in the form of TEFLON rings or the like.

The lower face of the armature 12 forms one boundary of a coupling air gap 37, the lower boundary of which is formed by the upper face of the armature 17. The periphery of this disk-shaped coupling air gap 37 is preferably formed by planar surfaces, with the coupling air gap preferably being significantly smaller than the working air gap 31 in the non-operative state. An anti-adhesive disk 38 may be arranged on the lower face of the armature 12 or on the upper face of the armature 17.

The armature 17 and the pole piece 28 form a transmission air gap 39 that is defined between the cylindrical outer peripheral surface of the armature 17 and the cylindrical inner peripheral surface of the pole piece 28, with the sleeve 14 extending through this transmission air gap. The axial length of the pole piece 28 is preferably slightly longer than that of the armature 17, with the armature 17 preferably projecting slightly downward from the pole piece 28 in the non-operative position.

The valve assembly 1 described so far functions as follows: The magnetizing coil 24 does not generate a magnetic field in the currentless state. The closing spring 23 presses the valve closing element 9 against its valve seat 11 such that the opening 15 is closed. The closing spring 23 is supported on the valve closing element 9 at one end and on the body 8 at its other end. The stronger closing spring 22 simultaneously presses the body 8 away from the pole piece 28 such that the sealing member 7 is seated on the valve seat 6. The gas chamber formed above the valve seats 6, 11 is consequently double-sealed by the valve closing element 9 on the one hand and the valve closing element 5 on the other hand. The latter forms a hermetically sealed unit together with the sleeve 14 and the armature 12.

The gas chamber is hermetically sealed relative to the outside by the keeper sleeve 26 that is pushed over the yoke 25 and the coil 24. The keeper sleeve 26 is realized in the form of a three-piece component that only requires gas-tight mechanical connections between the sleeve 29 and the respective pole pieces 27, 28.

Figure 2:
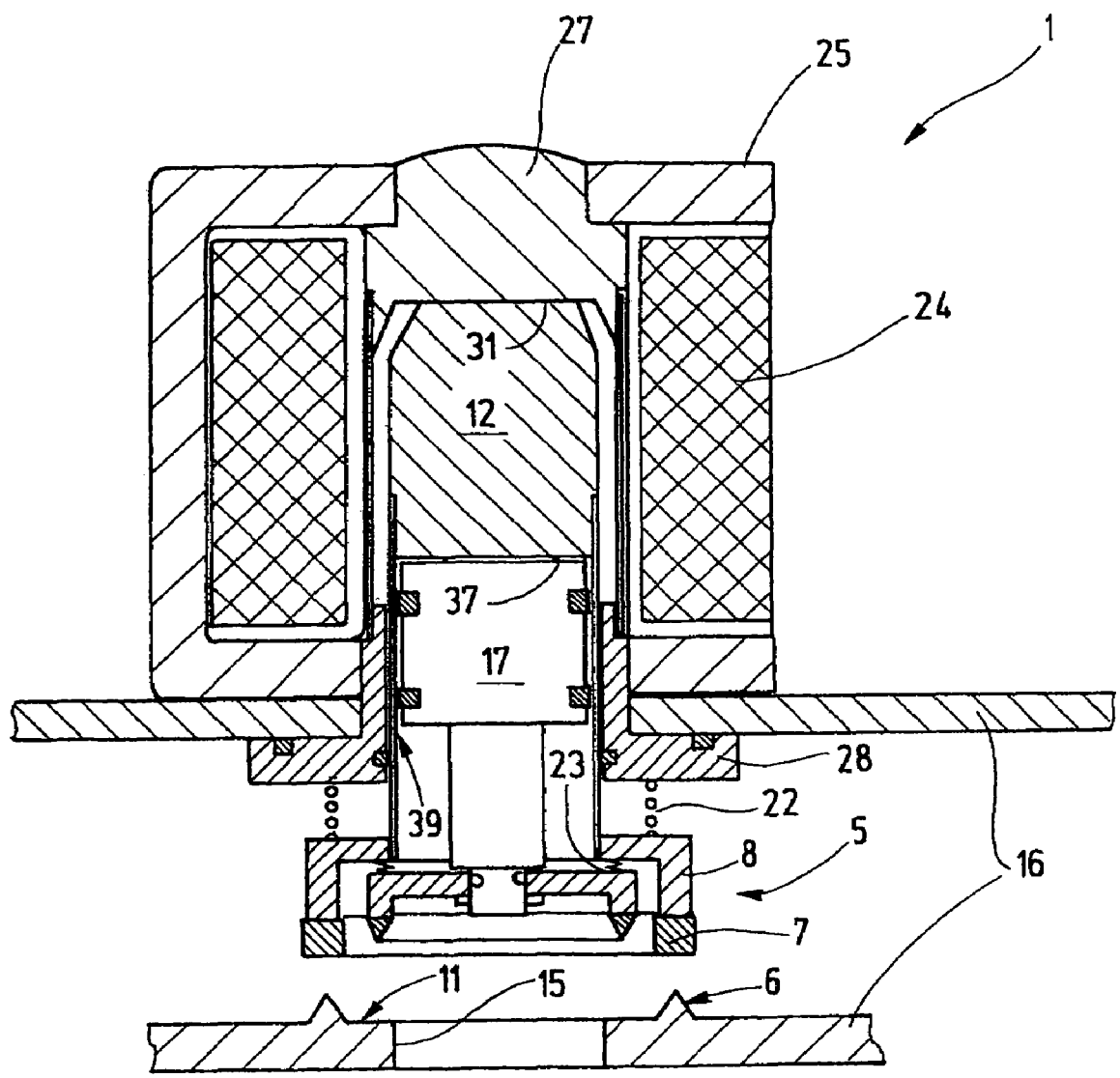
FIG. 2 is a schematic longitudinal section through the valve assembly according to FIG. 1, in the open position.

A current is applied to the coil 24 in order to open the valve assembly 1. This results in the state shown in the FIG. 2. The magnetic flux extends from the pole piece 28 into the armature 17 through the transmission air gap 39. In addition, the magnetic flux extends through the air gap 37 such that a force of attraction is built up between the armatures 12, 17. This force of attraction causes the valve closing element 5 to be lifted off the valve seat 6 against the force of the closing spring 23 that is compressed during this process. The magnetic flux also extends through the working air gap 31 between the pole piece 27 and the armature 12. This means that both armatures 12, 17 that are magnetically pulled toward one another are simultaneously moved upward and away from the valve seats 6, 11 against the force of the closing spring 22. This causes the valve assembly 1 to assume the position shown in FIG. 2. Opening 15 is now open. Only a very low flow resistance is generated due to the combination of the valve seats 6, 11.

Figure 3:
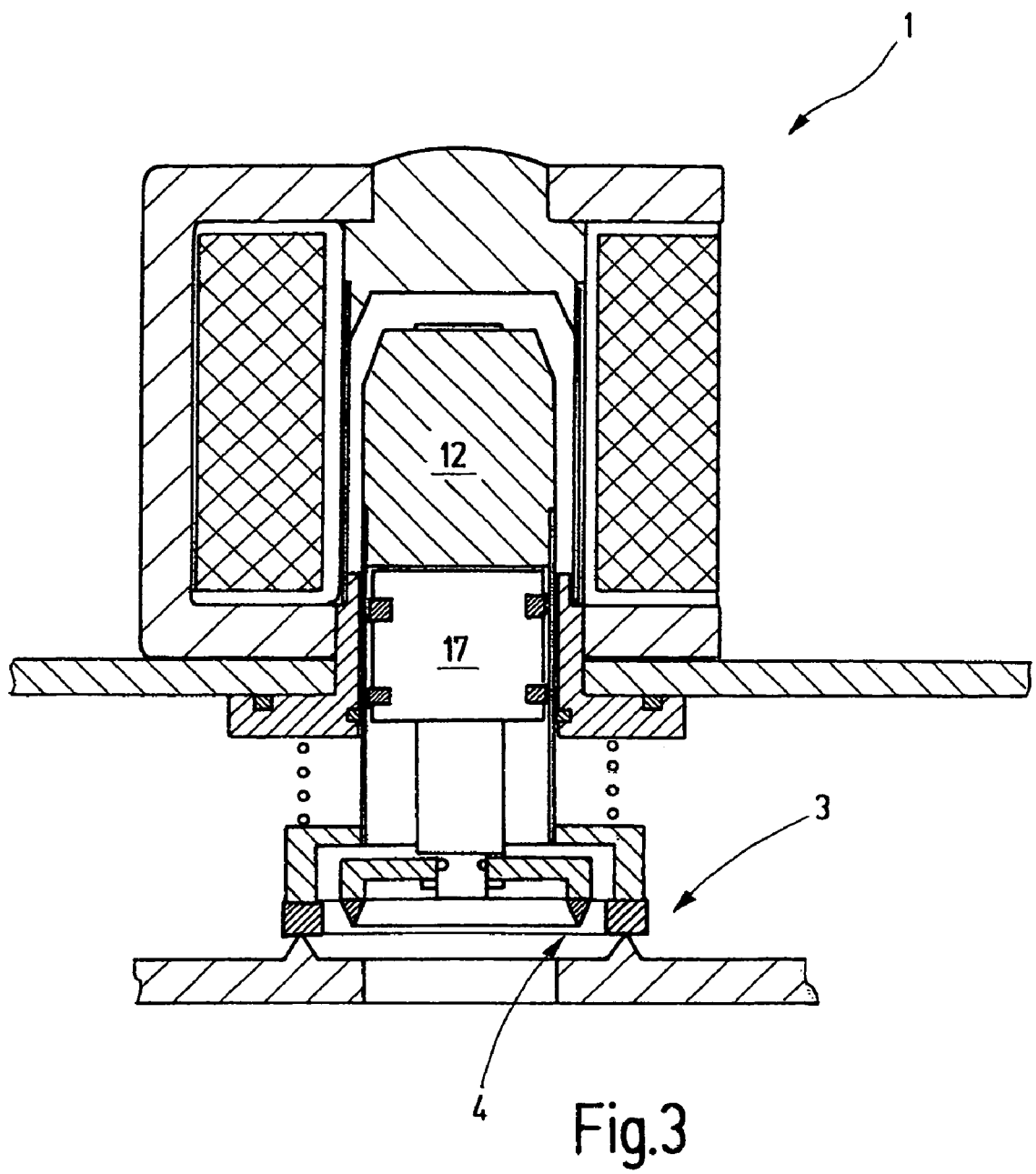
FIG. 3 is a schematic longitudinal section through the valve assembly according to FIG. 1 in the closed position, where the second armature has become stuck.

If the valve assembly functions properly, both armatures 12, 17 immediately return to the closed position shown in FIG. 1 when the coil 24 is rendered currentless. However, the valve assembly 1 can also close when a malfunction occurs, for example, if the armature 17 adheres to the armature 12 due to fouling or other influences. This is illustrated in FIG. 3. In this case, the outer valve 3 is closed although the inner valve 4 is still open.

Figure 4:
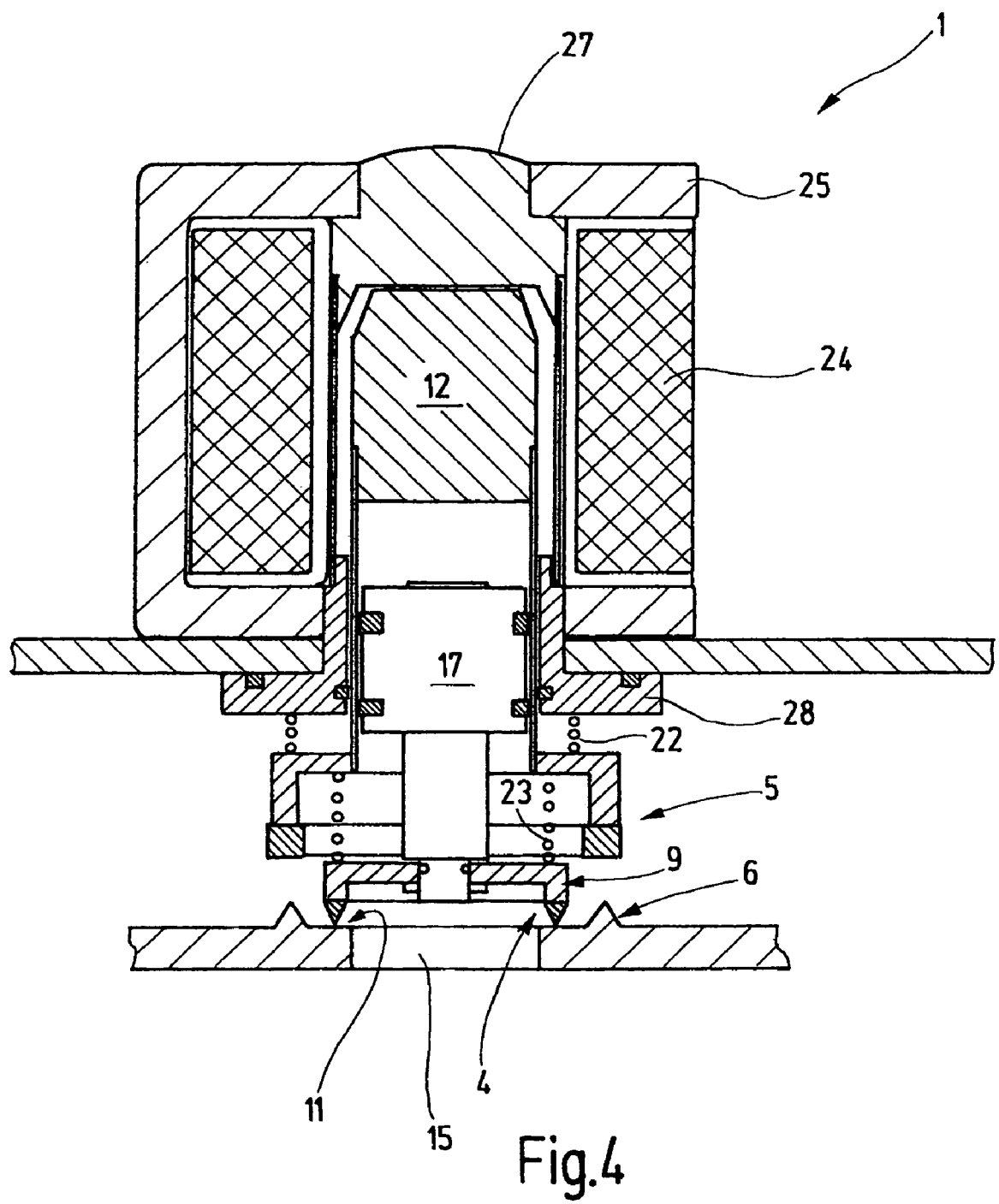
FIG. 4 shows the valve assembly according to FIG. 1 in the closed position, wherein the first armature has become stuck.

When the opposite malfunction occurs, for example, if the armature 12 and the valve closing element 5 connected to it move sluggishly and become stuck in the open position, the valve 4 is still able to close, as is shown in FIG. 4.

The coupling air gap 37 forms a magnetic coupling that is effective between the armatures 12, 17 and connects the armatures 12, 17 into one unit as long as a current is applied to the coil 24. The armatures 12, 17 are collectively moved into the open position. This is achieved by making the working air gap 37 significantly narrower than the working air gap 31. The maximum travel of the armature 17 within the sleeve 14 occurs when the armature 12 is in the attraction position, and is at least as large as the entire path to be traveled by the valve closing element 5 between the open position and the closed position. This enables the valve 4 to close in an unobstructed fashion in case the valve 3 becomes stuck.

In a modified embodiment, the sleeve 14 is replaced with a cup, the bottom of which extends through the working air gap 31. The pole piece 27 is positioned on the outside of the cup bottom in this case. The bottom of the cup may also fulfill the function of the antiadhesive disk 32. The advantage of this embodiment can be seen in the fact that only the connection between the edge of the cup and the pole piece 28 needs to be realized in a gas-tight fashion.

Figure 5:
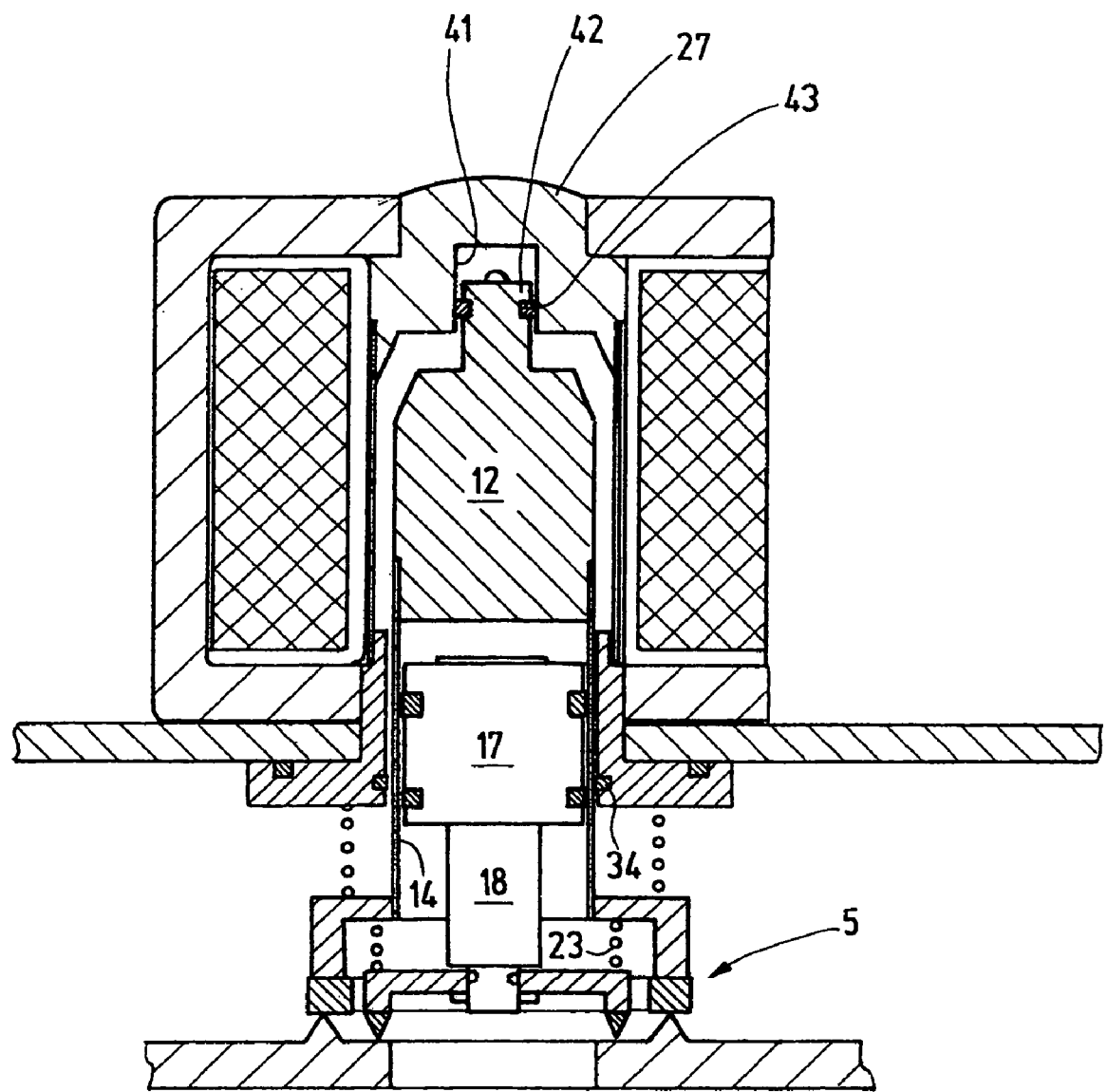
FIG. 5 is a schematic longitudinal section through a modified embodiment of the valve assembly, in the closed position.

Another modification is shown in FIG. 5. According to this modification, the unit consisting of the armature 12 and the sleeve 14 is guided and supported not only by the sliding ring 34, but also at the upper end of the armature 12, for example, by a pin 42 that projects into an opening 41 of the pole piece 27. The cylindrical pin, for example, may contain a peripheral groove with a sliding ring 43 inserted therein. Alternatively, the pin may have a polygonal cross section and be provided with sliding elements on its edges. The advantage of this embodiment can be seen in the superior guidance of the valve closing element 5.

Figure 6:
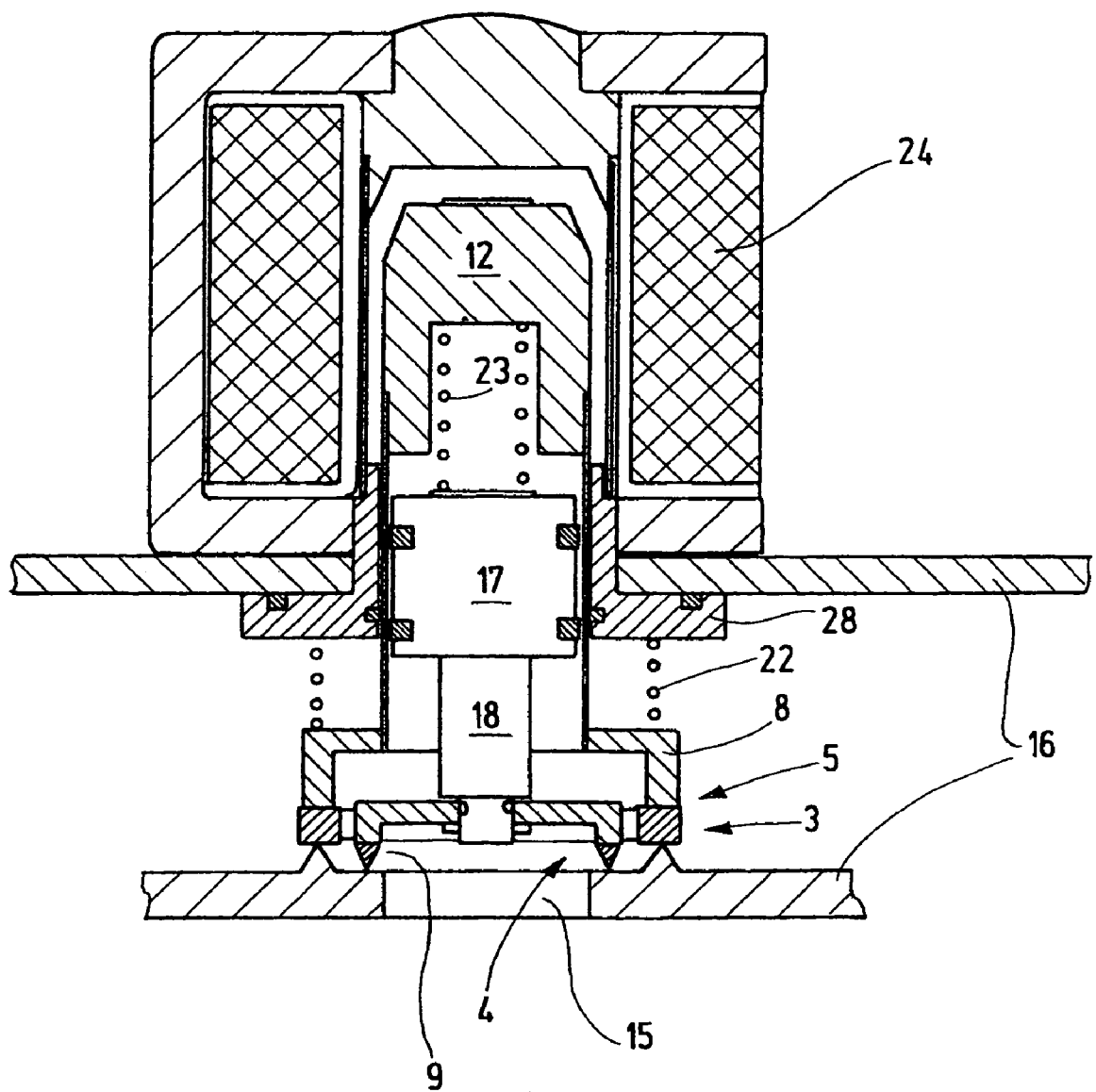
FIG. 6 is a schematic longitudinal section through an additionally modified embodiment of the valve assembly according to FIG. 1, in the closed position.

Another modification is shown in FIG. 6. In this case, the closing spring 23 is arranged between the armatures 12, 17, by contrast to the previously described embodiments. For this purpose, the armature 12 and/or the armature 17 may be provided with a recess, for example, in the form of a central blind hole that partially or entirely accommodates the closing spring 23. The advantage of this embodiment can be seen in that a greater length is available for the compressed closing spring 23 than in the embodiments according to FIGS. 1-4. This simplifies the dimensioning and manufacture of the closing spring 23.

In another embodiment that is not illustrated in the figures, the closing spring 23 is realized in the form of a tension spring that extends through the opening 15 and engages with the valve closing element 9 or the valve spindle 18. This tension spring is suspended on a suitable mounting device underneath the opening 15. However, this is only possible when the opening 15 is free. In some embodiments, it may be advantageous to install a control element, for example, in the form of a flow controller, a pressure controller or a modulation valve in the opening 15. According to another modification of the present invention, the closing spring 23 may also be replaced with non-mechanical elements, for example, elements that magnetically repel one another. For example, elements of this type may be arranged on the upper side, i.e., the side of the valve closing element 9 facing away from the opening 15, and on the underside, i.e., the side of the pole piece 28 facing toward the opening 15. For example, if a ring of a material that can be magnetically polarized, and the north poles of which lie on the upper side, is arranged on the valve closing element 9 and a magnetically polarized ring, the north poles of which lie on the underside, is arranged on the underside of the pole piece 28, and if the body 8 consists of a magnetic [sic; magnetically] non-shielding material such as aluminum, a closing force is exerted upon the valve closing element 9 regardless of whether or not the magnetizing coil 24 is supplied with a current. This closing force replaces the closing spring 23. The same effect can be achieved by reversing the polarization of the two aforementioned rings. The embodiment in which the inner valve 4 is closed magnetically is advantageous due to its particularly simple assembly. In addition, the closing force of the valve 4 is no longer supported against the valve closing element 5 of the valve 3, but rather directly against the valve housing 16.

Figure 7:
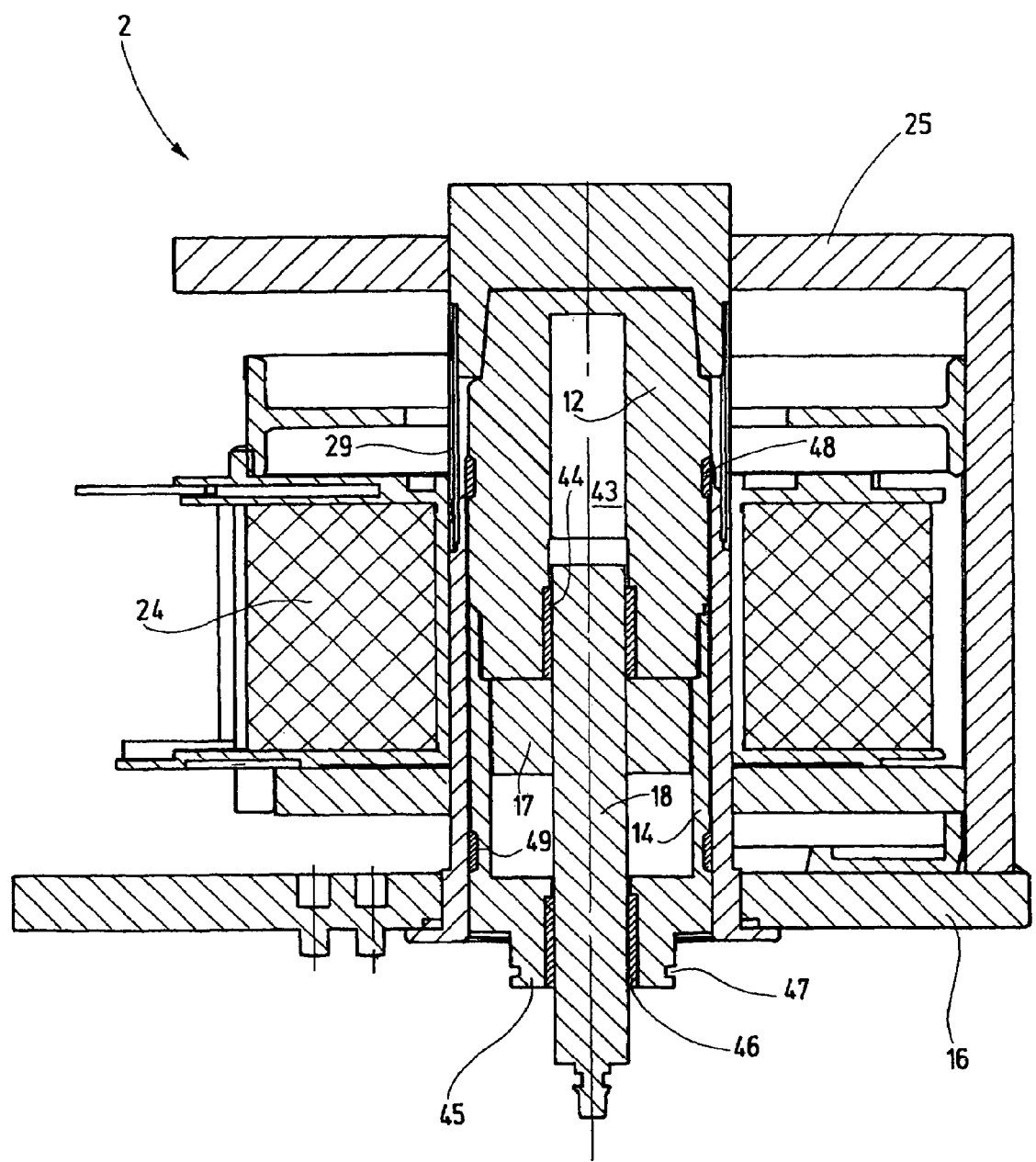
FIG. 7 is a schematic longitudinal section through another embodiment of a driving device of the valve assembly, in the open position.

FIG. 7 shows a modified embodiment of the solenoid actuator 2. In this case, the same reference symbols as in the preceding description are used for components that essentially correspond to the above-described embodiments.

The distinctive feature of the solenoid actuator 2 shown in FIG. 7 can be seen in the design of its armatures 12, 17. The armature 17 is realized in a hollow-cylindrical manner and is fixed on the valve spindle 18 by means of an interference fit or the like. This valve spindle projects beyond its upper face and engages into a blind hole 43 that is centrally arranged in the upper armature 12. The blind hole 43 can simultaneously serve as a guide opening for the upper end of the valve spindle 18. It can also receive a pressure spring that tends to move the armatures 12, 17 apart from one another. The valve spindle 18 can consequently be guided in the armature 12 by its upper end. This applies particularly if the upper end of the valve spindle 18 that projects beyond the upper face of the armature 17 is longer than the maximum relative movement between the two armatures 12, 17. The guidance may be realized with the aid of a slide bush 44 that consists, for example, of a friction-reducing plastic and is arranged on the wall of the blind hole 43.

The guidance of the lower end of the valve spindle 18 can be realized with the aid of a guide piece 45 that contains a central bushing-like section. This section contains a through-hole, in which a slide bush 46 is arranged. The guide piece 45 may be connected to or realized integrally with the sleeve 14. A lower extension of the guide piece 45 forms the drive of the armature 12 and is connected to the body 8 according to FIG. 1. An annular groove 47 can be arranged on the periphery for this purpose.

A particularly narrow air gap can be achieved between the armature 17 and the sleeve 14 due to this double radial support or sliding guidance of the valve spindle 18 at its upper and its lower end. This narrow air gap results in a lower magnetic reluctance. In addition, high forces of magnetic attraction can be easily achieved on the armature 17 while simultaneously reducing the dimensions of the magnetizing coil 24.

Preferably, the sleeve 14 is also realized in the form of a double sleeve. For this purpose, the armature 12 can be provided with a recessed annular groove on its cylindrical outer periphery, and a sliding ring 48 can be arranged in the annular groove. This sliding ring preferably consists of a plastic that generates only little friction relative to the sleeve 29. The sliding ring 48 projects slightly beyond the outer peripheral surface of the armature 12 and is seated in the sleeve 29 with little play. This means that the unit consisting of the armature 12 and the sleeve 14 is axially guided at its upper end. The axial guidance of this unit at its lower end is realized by arranging another annular groove in the outside surface of the sleeve 14 and arranging another sliding ring 49 in this annular groove. This sliding ring projects slightly beyond the outside surface of the sleeve 14 and is seated in the sleeve 29 with little play. The sliding ring preferably consists of plastic, and forms an axial sliding bearing.

The maximum relative speed between the two armatures 12, 17 can be defined by the clearance of the piston 17 in the sleeve 14. In this respect, pneumatic damping effects can be deliberately utilized or, if so required, prevented by means of axial holes through the piston 17.

A valve assembly 1 comprises two valves 3, 4 and a single solenoid actuator 2 with only one magnetizing coil 24 that controls both valves 3, 4. The corresponding magnetic circuit comprises a yoke 25 with only two pole pieces 27, 28. The valves 3, 4 are arranged concentric to one another. The valve closing element 5 of the outer valve 3 is connected to an armature 12 by means of a sleeve 14. The cup thus formed receives the armature 17 that is connected to the valve closing element 9 of the inner valve 4. The pole piece 28 and the armature 17 form a transmission air gap through which the sleeve 14 extends. A coupling air gap 37 is formed between the armatures 12, 17. The armature 12 and the pole piece 27 form a working air gap. The valves 3, 4 are opened collectively and are able to close independently of one another when the coil 24 is rendered currentless.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve assembly for gas applications comprising:
a first valve closing element that can be moved against a valve seat and is connected to a first armature;
a second valve closing element that can be moved against a valve seat and is connected to a second armature; and
a common magnetizing coil that is assigned to both armatures and encompassed by an outer yoke, wherein said yoke contains two pole pieces, one of which is assigned to the first armature and the other one of which is assigned to the second armature;
wherein the first armature and the second armature define a coupling air gap;
wherein the first armature and the pole piece assigned to it define a working air gap
wherein the second armature and the pole piece assigned to it define a transmission air gap;
wherein the first armature is connected to the valve closing element assigned to it by means of a pipe section;
wherein the pipe section extends through the transmission air gap;
wherein the axial length of the transmission air gap is greater than the axial travel of the second armature;
wherein the pipe section consists of ferromagnetic material, wherein its wall thickness is sufficiently small and its magnetic reluctance in the axial direction is sufficiently high that the predominant portion of the magnetic flux originating from the magnetizing coil extends through the two armatures in succession; and
wherein the first valve seat and the second valve seat are arranged coaxial one behind the other.

2. The valve assembly according to claim 1,
wherein the transmission air gap is realized cylindrically.

3. The valve assembly according to claim 1,
wherein the pipe section is supported in the pole piece assigned to the second armature by a centering means.

4. The valve assembly according to claim 1,
wherein the second armature is supported in the pipe section by centering means.

5. The valve assembly according to claim 3 or 4,
wherein the centering means are formed by at least one sliding ring.

\* \* \* \* \*